United States Patent
Yoshimoto et al.

(10) Patent No.: US 11,396,837 B2
(45) Date of Patent: Jul. 26, 2022

(54) EXHAUST GAS CLEANING CATALYST

(71) Applicant: TOYOTA JIDOSHA KABUSHIKI KAISHA, Toyota (JP)

(72) Inventors: Eriko Yoshimoto, Toyota (JP); Masahide Miura, Toyota (JP); Takahiro Nishio, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 17/006,060

(22) Filed: Aug. 28, 2020

(65) Prior Publication Data
US 2021/0148273 A1 May 20, 2021

(30) Foreign Application Priority Data

Nov. 15, 2019 (JP) .............................. JP2019-206778

(51) Int. Cl.
*B01J 21/06* (2006.01)
*B01J 23/42* (2006.01)
(Continued)

(52) U.S. Cl.
CPC ....... *F01N 3/2803* (2013.01); *B01D 53/9472* (2013.01); *B01J 23/42* (2013.01); *B01J 23/63* (2013.01); *B01J 23/83* (2013.01); *B01J 35/0006* (2013.01); *B01J 35/04* (2013.01); B01D 2255/1021 (2013.01); B01D 2255/1025 (2013.01); B01D 2255/20738 (2013.01); B01D 2255/908 (2013.01); B01D 2255/9035 (2013.01); B01D 2255/9155 (2013.01);
(Continued)

(58) Field of Classification Search
CPC . B01J 21/066; B01J 23/42; B01J 23/63; B01J 23/83; B01J 35/0006; B01J 35/04; F01N 3/2803
See application file for complete search history.

(56) References Cited

U.S. PATENT DOCUMENTS 5,883,037 A * 3/1999 Chopin .................... B01J 23/83
502/355
5,908,800 A * 6/1999 Bonneau .................. B01J 23/10
501/103
(Continued)

FOREIGN PATENT DOCUMENTS

JP 2008-018322 A 1/2008
JP 2015-037784 A 2/2015

*Primary Examiner* — Cam N. Nguyen
(74) *Attorney, Agent, or Firm* — Oliff PLC

(57) ABSTRACT

The present disclosure relates to an exhaust gas cleaning catalyst having a substrate and a catalyst coating layer coated on the substrate, in which the catalyst coating layer has an upstream-side coating layer formed from the upstream-side end portion of the exhaust gas cleaning catalyst in an exhaust gas flow direction and a downstream-side coating layer formed from the downstream-side end portion of the exhaust gas cleaning catalyst in the exhaust gas flow direction, when the upstream-side coating layer and the downstream-side coating layer overlap each other, the upstream-side coating layer is disposed on the downstream-side coating layer, and the upstream-side coating layer contains a catalytic metal and a $ZrO_2$—$CeO_2$ composite oxide in which Fe forms a solid solution.

5 Claims, 4 Drawing Sheets

(51) Int. Cl.
*B01J 23/63* (2006.01)
*B01J 23/83* (2006.01)
*B01J 35/00* (2006.01)
*B01J 35/04* (2006.01)
*F01N 3/28* (2006.01)
*B01D 53/94* (2006.01)

(52) U.S. Cl.
CPC ...... *F01N 2330/02* (2013.01); *F01N 2330/30* (2013.01); *F01N 2370/02* (2013.01)

(56) References Cited

U.S. PATENT DOCUMENTS

| | | | | |
|---|---|---|---|---|
| 6,585,944 | B1* | 7/2003 | Nunan | B01D 53/945 |
| | | | | 423/247 |
| 6,797,668 | B2* | 9/2004 | Yoshikawa | B01J 23/10 |
| | | | | 502/328 |
| 7,915,195 | B2* | 3/2011 | Takeshima | B01J 23/83 |
| | | | | 502/304 |
| 8,808,653 | B2* | 8/2014 | Mikita | B01J 23/894 |
| | | | | 502/349 |
| 9,308,516 | B2* | 4/2016 | Houshito | B01J 37/0248 |
| 9,533,290 | B2* | 1/2017 | Nagao | B01J 23/8892 |
| 9,962,684 | B2* | 5/2018 | Hayashida | C01G 25/006 |
| 10,507,457 | B2* | 12/2019 | Kadota | B01J 23/002 |
| 2002/0049137 | A1* | 4/2002 | Morikawa | B01D 53/945 |
| | | | | 502/251 |
| 2009/0325793 | A1 | 12/2009 | Takeshima et al. | |
| 2012/0027654 | A1 | 2/2012 | Mikita et al. | |

\* cited by examiner

EXHAUST GAS CLEANING CATALYST

CROSS-REFERENCE TO RELATED APPLICATION

This application claims priority to Japanese Patent Application No. 2019-206778 filed on Nov. 15, 2019, incorporated herein by reference in its entirety.

BACKGROUND

1. Technical Field

The present disclosure relates to an exhaust gas cleaning catalyst.

2. Description of Related Art

In exhaust gas discharged from internal combustion engines for automobiles and the like, for example, internal combustion engines, such as gasoline engines or diesel engines, harmful components, for example, carbon monoxide (CO), hydrocarbons (HC), and nitrogen oxides (NOx) are contained.

Therefore, in general, an exhaust gas cleaning device for decomposing and removing the harmful components is provided in internal combustion engines, and an exhaust gas cleaning catalyst mounted in the exhaust gas cleaning device detoxifies most of the harmful components. As such an exhaust gas cleaning catalyst, for example, a three-way catalyst or a NOx storage reduction catalyst is known.

The three-way catalyst is a catalyst that oxidizes CO and HC and reduces NOx at the same time in a stoichiometric (stoichiometric air-fuel ratio) atmosphere.

The NOx storage reduction catalyst is a catalyst that oxidizes NO in exhaust gas into $NO_2$ in a lean atmosphere, stores $NO_2$, and reduces $NO_2$ into nitrogen ($N_2$) in a stoichiometric atmosphere and a rich atmosphere. In the NOx storage reduction catalyst, a change in exhaust gas components in the lean atmosphere, the stoichiometric atmosphere, and the rich atmosphere is skillfully used.

However, even in the case of employing this catalyst, a problem still remains with the cleaning of exhaust gas, and a variety of studies are underway.

For example, Japanese Unexamined Patent Application Publication No. 2008-018322 discloses an exhaust gas cleaning catalyst containing a ceria-zirconia composite oxide and an iron oxide that is dispersed in the ceria-zirconia composite oxide and at least partially forms a solid solution.

Japanese Unexamined Patent Application Publication No. 2015-037784 discloses an exhaust gas cleaning catalyst in which a catalytic activity component containing a noble metal and a promotor component containing an oxygen storage material are supported by a carrier. The oxygen storage material contains cerium, zirconium, and iron, and the content of iron in the oxygen storage material is 0.01% by weight or more and less than 0.70% by weight (in terms of $Fe_2O_3$) with respect to the total weight of the oxygen storage material. The oxygen storage material is (a) a composite oxide or solid solution of iron and a metal containing cerium and zirconium or (b) formed by supporting iron by the surface of a composite oxide or solid solution of a metal containing cerium and zirconium. A first catalyst layer containing the catalytic activity component or the promotor component and a second catalyst layer are sequentially laminated on the carrier, and the second catalyst layer contains the oxygen storage material.

SUMMARY

From the viewpoint of restrictions on exhaust gas that are becoming stricter and resource risks, there is a demand for reducing the amount of noble metal as catalytic metal that is used in exhaust gas cleaning catalysts. In order to reduce the amount of noble metal, it is desirable to suppress the degradation of the catalytic activities of noble metal caused by the use of exhaust gas cleaning catalysts.

In exhaust gas cleaning catalysts, one of the factors that degrade the catalytic activities is the poisoning of the noble metal or carrier by HC, particularly, the poisoning of the noble metal or carrier by HC in a rich atmosphere.

Therefore, an object of the present disclosure is to provide an exhaust gas cleaning catalyst that improves in terms of catalyst performance, particularly HC cleaning performance, in a rich atmosphere in which poisoning by HC is likely to occur.

Among the catalytic activities, cleaning of NOx is carried out by, among noble metals, particularly, rhodium (Rh). The catalytic activities of Rh are susceptible to, particularly, poisoning by HC and are likely to be degraded by poisoning by HC. Therefore, suppression of the poisoning of Rh by HC is effective for the suppression of the degradation of the catalytic activities, and, in order for that, there is a need for a technique for removing HC using a noble metal other than Rh.

For the cleaning of HC, a catalytic metal, for example, a noble metal is used, and, among noble metals, platinum (Pt) and palladium (Pd) are excellent. Therefore, in order to suppress the poisoning of Rh by HC, there is a need for improving the HC cleaning efficiency of the catalytic metal.

In exhaust gas cleaning catalysts of the related art, the HC cleaning efficiency of catalytic metals contained in coating layers is low, HC that is not completely cleaned in the front portion of the exhaust gas cleaning catalyst flows into the rear portion of the exhaust gas cleaning catalyst, and, in the rear portion of the exhaust gas cleaning catalyst, poisoning by HC, particularly, poisoning of Rh by HC occurs.

Therefore, the present inventors carried out a variety of studies regarding means for solving the problem, consequently found the following fact, and completed the present disclosure. The fact found is that, in an exhaust gas cleaning catalyst having a substrate and a catalyst coating layer coated on the substrate, an upstream-side coating layer formed from the upstream-side end portion of the exhaust gas cleaning catalyst in an exhaust gas flow direction and a downstream-side coating layer formed from the downstream-side end portion of the exhaust gas cleaning catalyst in the exhaust gas flow direction are disposed as the catalyst coating layer, a catalytic metal, for example, Pt and/or Pd and a zirconia-ceria ($ZrO_2$—$CeO_2$) composite oxide in which Fe form a solid solution are disposed in the upstream-side coating layer, and furthermore, when the upstream-side coating layer and the downstream-side coating layer overlap each other, the downstream-side coating layer is disposed below the upstream-side coating layer, whereby, due to an atmosphere having a sufficient concentration of oxygen ($O_2$) that is supplied from the $ZrO_2$—$CeO_2$ composite oxide in which Fe forms a solid solution in the upstream-side coating layer, it is possible to improve the HC cleaning efficiency of the catalytic metal, for example, Pt and/or Pd, particularly, in a rich atmosphere, and efficiently clean HC.

That is, the gist of the present disclosure is as described below.

(1) An exhaust gas cleaning catalyst has a substrate and a catalyst coating layer coated on the substrate.

The catalyst coating layer has an upstream-side coating layer formed from the upstream-side end portion of the exhaust gas cleaning catalyst in an exhaust gas flow direction and a downstream-side coating layer formed from the downstream-side end portion of the exhaust gas cleaning catalyst in the exhaust gas flow direction.

When the upstream-side coating layer and the downstream-side coating layer overlap each other, the upstream-side coating layer is disposed on the downstream-side coating layer.

The upstream-side coating layer contains a catalytic metal and a $ZrO_2$—$CeO_2$ composite oxide in which Fe forms a solid solution.

(2) In the exhaust gas cleaning catalyst according to (1), the width of the upstream-side coating layer is 15% to 65% of the total length of the substrate in the exhaust gas cleaning catalyst from the upstream-side end portion of the exhaust gas cleaning catalyst in the exhaust gas flow direction.

(3) In the exhaust gas cleaning catalyst according to (1), the width of the upstream-side coating layer is 22% to 60% of the total length of the substrate in the exhaust gas cleaning catalyst from the upstream-side end portion of the exhaust gas cleaning catalyst in the exhaust gas flow direction.

(4) In the exhaust gas cleaning catalyst according to any one of (1) to (3), the width of the downstream-side coating layer is 60% to 100% of the total length of the substrate in the exhaust gas cleaning catalyst from the downstream-side end portion of the exhaust gas cleaning catalyst in the exhaust gas flow direction, and the wrap width of a region in which the upstream-side coating layer and the downstream-side coating layer overlap each other is 10% to 40% of the total length of the substrate in the exhaust gas cleaning catalyst.

(5) In the exhaust gas cleaning catalyst according to any one of (1) to (4), the amount of the $ZrO_2$—$CeO_2$ composite oxide in which Fe forms a solid solution is 10 g to 45 g with respect to 1 L of the substrate.

(6) In the exhaust gas cleaning catalyst according to any one of (1) to (4), the amount of the $ZrO_2$—$CeO_2$ composite oxide in which Fe forms a solid solution is 15 g to 40 g with respect to 1 L of the substrate.

The present disclosure provides an exhaust gas cleaning catalyst that improves in terms of catalyst performance, particularly HC cleaning performance, in a rich atmosphere in which poisoning by HC is likely to occur.

BRIEF DESCRIPTION OF DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
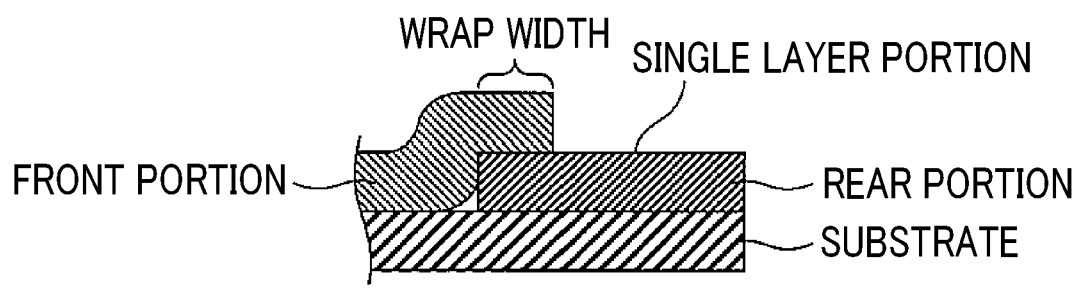
FIG. 1 is a view schematically showing an embodiment of a catalyst coating layer of the present disclosure.

Hereinafter, a preferred embodiment of the present disclosure will be described in detail.

In the present specification, features of the present disclosure will be described with appropriate reference to drawings. In the drawings, the dimensions and shape of each part are exaggerated for clarity, and the actual dimensions and shape are not accurately drawn. Therefore, the technical scope of the present disclosure is not limited to the dimensions and shape of each part shown in these drawings. An exhaust gas cleaning catalyst of the present disclosure is not limited to the following embodiment and can be carried out in a variety of forms in which a modification, an improvement, or the like is made to an extent that a person skilled in the art can make within the scope of the gist of the present disclosure.

The present disclosure relates to an exhaust gas cleaning catalyst having a substrate and a catalyst coating layer coated on the substrate, in which the catalyst coating layer has an upstream-side coating layer and a downstream-side coating layer, when the upstream-side coating layer and the downstream-side coating layer overlap each other, the upstream-side coating layer is disposed on the downstream-side coating layer, and the upstream-side coating layer contains a catalytic metal and a $ZrO_2$—$CeO_2$ composite oxide in which Fe forms a solid solution.

Substrate

As the substrate, it is possible to use a substrate having a well-known honeycomb shape, and, specifically, a honeycomb-shaped monolith substrate (a honeycomb filter, a high-density honeycomb, or the like) or the like is preferably employed. In addition, the material of such a substrate is also not particularly limited, and a substrate made of ceramic, such as cordierite, silicon carbide, silica, alumina, or mullite, or a substrate made of metal, such as stainless steel containing chromium and aluminum, is preferably employed. Among these, cordierite is preferred from the viewpoint of costs.

Catalyst Coating Layer

The catalyst coating layer has at least an upstream-side coating layer and a downstream-side coating layer.

The upstream-side coating layer is formed from the end portion (end surface) of the exhaust gas cleaning catalyst on the upstream side (the side from which the exhaust gas flows in) in the exhaust gas flow direction, and the width of the upstream-side coating layer is ordinarily 10% to 100%, preferably 10% to less than 100%, more preferably 10% to 80%, still more preferably 15% to 65%, particularly 20% to 60%, and more particularly 22% to 60% of the total length of the substrate in the exhaust gas cleaning catalyst.

When the width of the upstream-side coating layer is within the range, it is possible to improve the contact frequency between the catalytic metal and the $ZrO_2$—$CeO_2$ composite oxide in which Fe forms a solid solution, which are contained in the upstream-side coating layer, and furthermore, the contact frequency between the material, particularly, the catalytic metal, and HC while suppressing the agglomeration of the catalytic metal caused when the width is too narrow, for example, the agglomeration of Pt caused by the densification of Pt, and it is possible to improve the HC cleaning performance.

The downstream-side coating layer is formed from the end portion (end surface) of the exhaust gas cleaning catalyst on the downstream side (the side from which the exhaust gas flows out) in the exhaust gas flow direction, and the width of the downstream-side coating layer is ordinarily 10% to 100%, for example, 60% to 100%, and preferably 20% to 80% of the total length of the substrate in the exhaust gas cleaning catalyst.

The upstream-side coating layer and the downstream-side coating layer may integrally form a single layer on the entire substrate or may have a region in which the coating layers overlap each other. When the upstream-side coating layer and the downstream-side coating layer have a region in which the coating layers overlap each other, the upstream-side coating layer is provided on the downstream-side coating layer. The upstream-side coating layer is preferably provided on the region in which the downstream-side coating layer is not coated and on the downstream-side coating layer, and the downstream-side coating layer is preferably provided on the region in which the upstream-side coating layer is not coated and on the upstream-side coating layer.

When the upstream-side coating layer is provided on the downstream-side coating layer, the wrap width of the region in which the upstream-side coating layer and the downstream-side coating layer overlap each other is ordinarily 1% to 45%, preferably 10% to 40%, and more preferably 10% to 25% of the total length of the substrate in the exhaust gas cleaning catalyst.

FIG. 1 schematically shows an embodiment of the catalyst coating layer when the upstream-side coating layer (front portion) is provided on the region in which the downstream-side coating layer (rear portion) is not coated and on the downstream-side coating layer in the present disclosure.

As long as the catalyst coating layer includes the upstream-side coating layer and the downstream-side coating layer in the uppermost layer, the catalyst coating layer may a layer only including the upstream-side coating layer and the downstream-side coating layer or may have one or more layers, that is, one layer, two layers, three layers, or four or more layers (lower layer catalyst coating layers) below the layer only including the upstream-side coating layer and the downstream-side coating layer. The composition and structure of the lower layer catalyst coating layer are not particularly limited, and the composition and the structure may be the same as or different from the composition and the structure of the upstream-side coating layer and/or the downstream-side coating layer. Furthermore, the lower layer catalyst coating layer does not need to be uniform throughout the entire substrate of the exhaust gas cleaning catalyst at all times and may have a composition and a structure that differ in the upstream-side region and the downstream-side region in the exhaust gas flow direction like the uppermost layer.

Upstream-Side Coating Layer

The upstream-side coating layer contains a catalytic metal and a $ZrO_2$—$CeO_2$ composite oxide in which Fe forms a solid solution.

The $ZrO_2$—$CeO_2$ composite oxide in which Fe forms a solid solution, which is contained in the upstream-side coating layer, is an ordinarily-known composite oxide in the technical field of exhaust gas cleaning catalysts and is a material that has an oxygen storage capacity (OSC), with which oxygen is stored in the lean atmosphere and is released in the rich atmosphere, and is thus excellent in terms of the oxygen storage and release capability. The $ZrO_2$—$CeO_2$ composite oxide in which Fe forms a solid solution is a composite oxide or solid solution containing $ZrO_2$, $CeO_2$, and Fe, and, optionally, $La_2O_3$, $Y_2O_3$, and/or $Nd_2O_3$.

In the $ZrO_2$—$CeO_2$ composite oxide in which Fe forms a solid solution, which is contained in the upstream-side coating layer, the weight ratio between $ZrO_2$ and $CeO_2$ ($ZrO_2$:$CeO_2$) is not limited, and is ordinarily 1:1 to 3:1, for example, 2:1.

In the $ZrO_2$—$CeO_2$ composite oxide in which Fe forms a solid solution, which is contained in the upstream-side coating layer, the amount of Fe is not limited, but is ordinarily 0.1% by weight to 2% by weight and preferably 0.1% by weight to 1% by weight of the total weight of the $ZrO_2$—$CeO_2$ composite oxide in which Fe forms a solid solution in terms of $Fe_2O_3$.

The amount of the $ZrO_2$—$CeO_2$ composite oxide in which Fe forms a solid solution, which is contained in the upstream-side coating layer, is ordinarily 10 g to 45 g and preferably 15 g to 40 g with respect to 1 L of the substrate.

The $ZrO_2$—$CeO_2$ composite oxide in which Fe forms a solid solution, which is contained in the upstream-side coating layer, can be manufactured, for example, as described below.

First, aqueous solutions of raw materials such as iron, cerium, and zirconium, for example, iron nitrate, cerium nitrate, and zirconium oxynitrate are mixed together to obtain a raw material mixture. Next, the raw material mixture is added dropwise to ammonia water while being stirring to form a precipitate. Subsequently, the formed precipitate is washed with ion-exchanged water and dried, for example, in a dryer at 100° C. to 150° C. for two hours to 24 hours to obtain a dried precipitate. Finally, the obtained dried precipitate is fired, for example, in an electric furnace at 400° C. to 600° C. for one hour to three hours to obtain a $ZrO_2$—$CeO_2$ composite oxide in which Fe forms a solid solution.

When the upstream-side coating layer contains the $ZrO_2$—$CeO_2$ composite oxide in which Fe forms a solid solution, which is excellent in terms of the oxygen absorption and release performance, $O_2$, which is used during the combustion of HC, is sufficiently supplied, and the HC cleaning performance of the catalytic metal, for example, Pt or Pd in, particularly, a rich atmosphere improves.

The catalytic metal contained in the upstream-side coating layer is a catalytic metal that is ordinarily used in the technical field of exhaust gas cleaning catalysts, and examples thereof include noble metals, specifically, Pt, Pd, Rh, gold (Au), silver (Ag), iridium (Ir), and ruthenium (Ru). Among these, at least one kind selected from the group only including Pt, Pd, Rh, Ir, and Ru is preferred, and Pt and/or Pd is more preferred from the viewpoint of the catalyst performance.

The amount of the catalytic metal contained in the upstream-side coating layer is not limited, but is ordinarily 0.01 g to 1.0 g and preferably 0.1 g to 0.5 g with respect to 1 L of the substrate in terms of the metal of the catalytic metal.

When the upstream-side coating layer contains the catalytic metal, that is, the coating layer containing the catalytic metal is disposed on the upstream side, that is, in the front portion of the exhaust gas cleaning catalyst, the HC cleaning performance improves due to an improvement in ignitability resulting from the densification of the catalytic metal, for example, Pt or Pd.

The catalytic metal contained in the upstream-side coating layer functions as an exhaust gas cleaning catalyst as it is, but is preferably supported by the $ZrO_2$—$CeO_2$ composite oxide in which Fe forms a solid solution or a powder carrier, which is optionally and selectively contained in the exhaust gas cleaning catalyst of the present disclosure.

The powder carrier by which the catalytic metal is supported is not particularly limited and may be a random metal oxide that is ordinarily used as a powder carrier in the technical field of exhaust gas cleaning catalysts.

Therefore, the upstream-side coating layer may further contain the powder carrier. Examples of the powder carrier include metal oxides, such as silica ($SiO_2$), magnesium oxide (MgO), zirconia ($ZrO_2$), ceria ($CeO_2$), alumina ($Al_2O_3$), titania ($TiO_2$), yttria ($Y_2O_3$), neodymium oxide ($Nd_2O_3$), and lanthanum oxide ($La_2O_3$), composite oxides or solid solutions thereof, combinations of two or more kinds thereof, and the like.

For example, $CeO_2$ has an oxygen storage capacity (OSC), with which oxygen is stored in the lean atmosphere and is released in the rich atmosphere, and is thus capable of maintaining the stoichiometric atmosphere in the exhaust gas cleaning catalyst. $Al_2O_3$, $ZrO_2$, and other metal oxides are capable of enhancing the endurance of the carrier when added.

According to the characteristics of the powder carrier, it needs to be understood that there is a possibility that the exhaust gas cleaning performance, particularly, the HC cleaning performance, of the exhaust gas cleaning catalyst of the present disclosure may improve depending on the kinds, composition, combination and ratio, and/or amounts of selected powder carriers.

When the catalytic metal is supported by the $ZrO_2$—$CeO_2$ composite oxide in which Fe forms a solid solution or the powder carrier, the specific surface area of the powder carrier is large, and thus it is possible to increase the contact surface between exhaust gas and the catalytic metal. This configuration enables an improvement in the performance of the exhaust gas cleaning catalyst.

As the method for supporting the catalytic metal by the $ZrO_2$—$CeO_2$ composite oxide in which Fe forms a solid solution or the powder carrier, it is possible to use a method that is ordinarily used in the technical field of exhaust gas cleaning catalysts.

The $ZrO_2$—$CeO_2$ composite oxide in which Fe forms a solid solution or the metal oxide may be contained in the upstream-side coating layer instead of supporting the catalytic metal.

The total weight of the powder carrier excluding the $ZrO_2$—$CeO_2$ composite oxide in which Fe forms a solid solution (but including a metal oxide that does not support the catalytic metal) in the upstream-side coating layer is not limited, but is ordinarily 10 g to 80 g and preferably 20 g to 60 g with respect to 1 L of the substrate.

The amount of the upstream-side coating layer provided is not limited, but is ordinarily 10 g to 100 g and preferably 30 g to 70 g per 1 L of the substrate.

The thickness of the upstream-side coating layer is not limited, but is ordinarily 10 μm to 90 μm and preferably 30 μm to 60 μm in terms of the average thickness. The thickness of the upstream-side coating layer can be measured with, for example, SEM.

When the amounts of the individual materials in the upstream-side coating layer and the thickness of the upstream-side coating layer are within the ranges, it is possible to maintain a pressure loss, the catalyst performance, and the endurance in the exhaust gas cleaning catalyst in a well-balanced manner.

Downstream-Side Coating Layer

The downstream-side coating layer preferably contains a catalytic metal.

The catalytic metal contained in the downstream-side coating layer is a catalytic metal that is ordinarily used in the technical field of exhaust gas cleaning catalysts, and examples thereof include noble metals, specifically, Pt, Pd, Rh, Au, Ag, Ir, and Ru. Among these, at least one kind selected from the group only including Rh, Pt, Pd, Ir, and Ru is preferred, Rh, Pt, and/or Pd is more preferred, and Rh is particularly preferred from the viewpoint of the catalyst performance.

The amount of the catalytic metal contained in the downstream-side coating layer is not limited, but is ordinarily 0.01 g to 1.0 g and preferably 0.1 g to 0.5 g with respect to 1 L of the substrate in terms of the metal of the catalytic metal.

When the downstream-side coating layer contains the catalytic metal, that is, the coating layer containing the catalytic metal is disposed on the downstream side, that is, in the rear portion of the exhaust gas cleaning catalyst, the catalytic metal, for example, Rh is capable of sufficiently exhibiting the NOx cleaning performance without being poisoned by HC in an atmosphere in which HC is sufficiently cleaned.

The catalytic metal contained in the downstream-side coating layer functions as an exhaust gas cleaning catalyst as it is; however, similar to the catalytic metal in the upstream-side coating layer, the catalytic metal is preferably supported by the powder carrier, which is optionally and selectively contained in the exhaust gas cleaning catalyst of the present disclosure.

The powder carrier by which the catalytic metal is supported is not particularly limited and may be a random metal oxide that is ordinarily used as a powder carrier in the technical field of exhaust gas cleaning catalysts.

Therefore, the downstream-side coating layer may further contain the powder carrier. Examples of the powder carrier include metal oxides, such as silica ($SiO_2$), magnesium oxide (MgO), zirconia ($ZrO_2$), ceria ($CeO_2$), alumina ($Al_2O_3$), titania ($TiO_2$), yttria ($Y_2O_3$), neodymium oxide ($Nd_2O_3$), and lanthanum oxide ($La_2O_3$), composite oxides or solid solutions thereof, for example, $ZrO_2$—$CeO_2$, combinations of two or more kinds thereof, and the like.

Acidic carriers, for example, $SiO_2$, have a favorable compatibility with catalytic metals that reduce NOx. Basic carriers, for example, MgO, have a favorable compatibility with K or Ba that stores NOx. $ZrO_2$ suppresses the sintering of other powder carriers at a high temperature at which the other powder carriers may be sintered, is combined with Rh, which is the catalytic metal, to cause a steam-reforming reaction and generate $H_2$, and is capable of efficiently reducing NOx. Acid-base amphoteric carriers, for example, $Al_2O_3$, have a high specific surface area and thus can be efficiently used to store and reduce NOx. $TiO_2$ is capable of exhibiting an effect for suppressing the sulfur poisoning of the catalytic metal. In addition, $Al_2O_3$, $ZrO_2$, and other metal oxides are capable of enhancing the endurance of the carrier when added.

According to the characteristics of the powder carrier, it needs to be understood that there is a possibility that the exhaust gas cleaning performance, particularly, the NOx cleaning performance, of the exhaust gas cleaning catalyst of the present disclosure may improve depending on the kinds, composition, combination and ratio, and/or amounts of selected powder carriers.

When the catalytic metal is supported by the powder carrier, the specific surface area of the powder carrier is large, and thus it is possible to increase the contact surface between exhaust gas and the catalytic metal. This configuration enables an improvement in the performance of the exhaust gas cleaning catalyst.

As the method for supporting the catalytic metal by the powder carrier, it is possible to use a method that is ordinarily used in the technical field of exhaust gas cleaning catalysts.

The metal oxide may be contained in the downstream-side coating layer instead of supporting the catalytic metal.

The total weight of the powder carrier (including a metal oxide that does not support the catalytic metal) in the downstream-side coating layer is not limited, but is ordinarily 30 g to 200 g and preferably 50 g to 160 g with respect to 1 L of the substrate.

The amount of the downstream-side coating layer provided is not limited, but is ordinarily 30 g to 200 g and preferably 50 g to 160 g per 1 L of the substrate.

The thickness of the downstream-side coating layer is not limited, but is ordinarily 10 μm to 100 μm and preferably 20 μm to 70 μm in terms of the average thickness. The thickness of the downstream-side coating layer can be measured with, for example, SEM.

When the amounts of the individual materials in the downstream-side coating layer and the thickness of the downstream-side coating layer are within the ranges, it is possible to maintain a pressure loss, the catalyst performance, and the endurance in the exhaust gas cleaning catalyst in a well-balanced manner.

Method for Manufacturing Exhaust Gas Cleaning Catalyst

The exhaust gas cleaning catalyst of the present disclosure can be manufactured using a well-known coating technique except that the configurational components of the exhaust gas cleaning catalyst described above are used.

The exhaust gas cleaning catalyst of the present disclosure can be manufactured, for example, as described below. First, a region in which the downstream-side coating layer is to be formed on the substrate is coated with a catalyst coating layer slurry for the downstream-side coating layer containing materials that configure the downstream-side coating layer by the wash coat method. Examples of the materials that configure the downstream-side coating layer include a material containing Rh, which is a catalytic metal, supported by a powder carrier made up of $ZrO_2$, $La_2O_3$, and $Y_2O_3$, a powder carrier, for example, $Al_2O_3$, a composite oxide made up of $CeO_2$, $ZrO_2$, $La_2O_3$, and $Y_2O_3$, a solvent (for example, water, an alcohol, a mixture of water and an alcohol, or the like), and, optionally, an additive (binder). After the excess slurry is blown off with a blower or the like, the catalyst coating layer slurry for the downstream-side coating layer is dried, for example, at 100° C. to 150° C. in the air for one hour to three hours to remove the solvent component, and fired in the air at 450° C. to 550° C. for one hour to three hours, thereby forming the downstream-side coating layer. Subsequently, a region in which the upstream-side coating layer is to be formed on the substrate, on which the downstream-side coating layer is formed, is coated with a catalyst coating layer slurry for the upstream-side coating layer containing materials that configure the upstream-side coating layer by the wash coat method. The materials that configure the upstream-side coating layer are a $ZrO_2$—$CeO_2$ composite oxide in which Fe forms a solid solution, a material including a catalytic metal, for example, Pt or Pd, supported by $Al_2O_3$ into which $La_2O_3$ is composited, a solvent (for example, water, an alcohol, a mixture of water and an alcohol, or the like), optionally, an additional powder carrier, an additive, and the like. The excess slurry is blown off with a blower or the like, then, the catalyst coating slurry for the upstream-side coating layer is dried, for example, at 100° C. to 150° C. in the air for one hour to three hours to remove the solvent component, and fired in the air at 450° C. to 550° C. for one hour to three hours, thereby forming the upstream-side coating layer.

Use of Exhaust Gas Cleaning Catalyst

The exhaust gas cleaning catalyst of the present disclosure is capable of exhibiting a significant effect on the HC cleaning performance in the rich atmosphere and can be used as an exhaust gas cleaning catalyst that develops an HC cleaning capability that is high enough for the exhaust gas cleaning catalyst to be used even in an environment in which excess HC or the like is adsorbed to the exhaust gas cleaning catalyst in the rich atmosphere and thus the exhaust gas cleaning catalyst can be poisoned.

Hereinafter, several examples relating to the present disclosure will be described, which is not intended to limit the present disclosure to such examples.

I. Performance Confirmation Experiment of Exhaust Gas Cleaning Catalyst

I-1. Material Used

Material 1 ($Al_2O_3$)

4% by weight of $La_2O_3$-composited $Al_2O_3$

Material 2 (ZY ($ZrO_2$—$Y_2O_3$))

Composite oxide of 84% by weight of $ZrO_2$, 6% by weight of $La_2O_3$, and 10% by weight of $Y_2O_3$ Material 3 (Pt/$Al_2O_3$)

Material including platinum nitrate supported by the material 1

(in an exhaust gas cleaning catalyst, the amount of Pt was adjusted to be 0.40 g with respect to 1 L of a substrate in terms of metal)

Material 4 (Rh/ZY)

Material including rhodium nitrate supported by the material 2

(in an exhaust gas cleaning catalyst, the amount of Rh was adjusted to be 0.36 g with respect to 1 L of a substrate in terms of metal)

Material 5 (ZC ($ZrO_2$—$CeO_2$))

Composite oxide of 30.0% by weight of $CeO_2$, 60.0% by weight of $ZrO_2$, 5.0% by weight of $La_2O_3$, and 5.0% by weight of $Y_2O_3$ Material 6 (Fe-ZC ($ZrO_2$—$CeO_2$ composite oxide in which Fe forms a solid solution))

Composite oxide of 29.7% by weight of $CeO_2$, 59.6% by weight of $ZrO_2$, 5.1% by weight of $La_2O_3$, 5.03% by weight of $Y_2O_3$, and 0.52% by weight of $Fe_2O_3$ Fe-ZC was prepared as described below. First, aqueous solutions of iron nitrate, cerium nitrate, and zirconium oxynitrate were mixed together to obtain a raw material mixture. Next, the raw material mixture was added dropwise to ammonia water while being stirring to form a precipitate. Subsequently, the formed precipitate was washed with ion-exchanged water and dried in a dryer at 120° C. for one night to obtain a dried precipitate. Finally, the obtained dried precipitate was fired in an electric furnace at 500° C. for two hours to obtain Fe-ZC.

Substrate
875-cc Cordierite honeycomb substrate (400 cells, square wall thickness: 4 mil)

I-2. Preparation of Exhaust Gas Cleaning Catalyst

EXAMPLE 1

First, the material 1, the material 4, the material 5, and an $Al_2O_3$-based binder were injected into distilled water while being stirred to prepare a suspended slurry 1.

Next, the prepared slurry 1 was splashed onto a substrate, and an unneeded component was blown off with a blower, whereby the wall surface of the substrate was coated with the material to prepare a precursor layer of a downstream-side coating layer. At that time, an adjustment was made such that the amount of the material 5 reached 25 g with respect to 1 L of the substrate (25 g/L), the amount of the material 1 reached 20 g with respect to 1 L of the substrate (20 g/L), and the amount of the material 4 reached 40 g with respect to 1 L of the substrate (40 g/L). In addition, an adjustment was made such that the coating width of the precursor layer of a downstream-side coating layer occupied 80% of the total length of the substrate in the exhaust gas cleaning catalyst from the downstream-side end portion of the exhaust gas cleaning catalyst in an exhaust gas flow direction.

Finally, moisture was extracted for two hours in the dryer held at 120° C., and then the precursor layer of a downstream-side coating layer was fired for two hours in the electric furnace held at 500° C., thereby preparing a downstream-side coating layer (rear portion).

Subsequently, the material 3, the material 6, and an $Al_2O_3$-based binder were injected into distilled water while being stirred in the same manner as described above to prepare a suspended slurry 2.

Next, the prepared slurry 2 was splashed onto the substrate on which the downstream-side coating layer was formed from the end surface opposite to the end surface on which the downstream-side coating layer was formed, and an unneeded component was blown off with a blower, whereby the wall surface of the substrate was coated with the material to prepare a precursor layer of an upstream-side coating layer. At that time, an adjustment was made such that the amount of the material 3 reached 13 g with respect to 1 L of the substrate (13 g/L), and the amount of the material 6 reached 25 g with respect to 1 L of the substrate (25 g/L). In addition, an adjustment was made such that the coating width of the precursor layer of an upstream-side coating layer occupied 40% of the total length of the substrate in the exhaust gas cleaning catalyst from the upstream-side end portion of the exhaust gas cleaning catalyst in the exhaust gas flow direction.

Finally, moisture was extracted for two hours in the dryer held at 120° C., and then the precursor layer of an upstream-side coating layer was fired for two hours in the electric furnace held at 500° C., thereby preparing an upstream-side coating layer (front portion), and finally, preparing an exhaust gas cleaning catalyst.

EXAMPLE 2

An exhaust gas cleaning catalyst was prepared in the same manner as in Example 1 except that, in Example 1, an adjustment was made such that the coating width of the precursor layer of an upstream-side coating layer occupied 60% of the total length of the substrate in the exhaust gas cleaning catalyst from the upstream-side end portion of the exhaust gas cleaning catalyst in the exhaust gas flow direction.

EXAMPLE 3

An exhaust gas cleaning catalyst was prepared in the same manner as in Example 1 except that, in Example 1, an adjustment was made such that the coating width of the precursor layer of an upstream-side coating layer occupied 22% of the total length of the substrate in the exhaust gas cleaning catalyst from the upstream-side end portion of the exhaust gas cleaning catalyst in the exhaust gas flow direction.

EXAMPLE 4

An exhaust gas cleaning catalyst was prepared in the same manner as in Example 1 except that, in Example 1, an adjustment was made such that the coating width of the precursor layer of a downstream-side coating layer occupied 100% of the total length of the substrate in the exhaust gas cleaning catalyst from the downstream-side end portion of the exhaust gas cleaning catalyst in the exhaust gas flow direction, and an adjustment was made such that the coating width of the precursor layer of an upstream-side coating layer occupied 100% of the total length of the substrate in the exhaust gas cleaning catalyst from the upstream-side end portion of the exhaust gas cleaning catalyst in the exhaust gas flow direction.

EXAMPLE 5

An exhaust gas cleaning catalyst was prepared in the same manner as in Example 1 except that, in Example 1, an adjustment was made such that the amount of the material 6 reached 15 g with respect to 1 L of the substrate (15 g/L).

EXAMPLE 6

An exhaust gas cleaning catalyst was prepared in the same manner as in Example 1 except that, in Example 1, an adjustment was made such that the amount of the material 6 reached 40 g with respect to 1 L of the substrate (40 g/L).

COMPARATIVE EXAMPLE 1

First, the material 1, the material 4, the material 5, and an $Al_2O_3$-based binder were injected into distilled water while being stirred to prepare a suspended slurry 1.

Next, the prepared slurry 1 was splashed onto a substrate, and an unneeded component was blown off with a blower, whereby the wall surface of the substrate was coated with the material to prepare a precursor layer of a downstream-side coating layer. At that time, an adjustment was made such that the amount of the material 5 reached 25 g with respect to 1 L of the substrate (25 g/L), the amount of the material 1 reached 20 g with respect to 1 L of the substrate (20 g/L), and the amount of the material 4 reached 40 g with respect to 1 L of the substrate (40 g/L). In addition, an adjustment was made such that the coating width of the precursor layer of a downstream-side coating layer occupied 100% of the total length of the substrate in the exhaust gas cleaning catalyst from the downstream-side end portion of the exhaust gas cleaning catalyst in an exhaust gas flow direction.

Finally, moisture was extracted for two hours in the dryer held at 120° C., and then the precursor layer of a downstream-side coating layer was fired for two hours in the electric furnace held at 500° C., thereby preparing a downstream-side coating layer (rear portion).

Subsequently, the material 3, the material 5, and an $Al_2O_3$-based binder were injected into distilled water under stirring in the same manner as described above to prepare a suspended slurry 2.

Next, the prepared slurry 2 was splashed onto the substrate on which the downstream-side coating layer was formed from the end surface opposite to the end surface on which the downstream-side coating layer was formed, and an unneeded component was blown off with a blower, whereby the wall surface of the substrate was coated with the material to prepare a precursor layer of an upstream-side coating layer. At that time, an adjustment was made such that the amount of the material 3 reached 13 g with respect to 1 L of the substrate (13 g/L), and the amount of the material 5 reached 25 g with respect to 1 L of the substrate (25 g/L). In addition, an adjustment was made such that the coating width of the precursor layer of an upstream-side coating layer occupied 100% of the total length of the substrate in the exhaust gas cleaning catalyst from the upstream-side end portion of the exhaust gas cleaning catalyst in an exhaust gas flow direction.

Finally, moisture was extracted for two hours in the dryer held at 120° C., and then the precursor layer of an upstream-side coating layer was fired for two hours in the electric furnace held at 500° C., thereby preparing an upstream-side coating layer (front portion), and finally, preparing an exhaust gas cleaning catalyst.

COMPARATIVE EXAMPLE 2

An exhaust gas cleaning catalyst was prepared in the same manner as in Comparative Example 1 except that, in Comparative Example 1, an adjustment was made such that the coating width of the precursor layer of a downstream-side coating layer occupied 80% of the total length of the substrate in the exhaust gas cleaning catalyst from the downstream-side end portion of the exhaust gas cleaning catalyst in the exhaust gas flow direction, and an adjustment was made such that the coating width of the precursor layer of an upstream-side coating layer occupied 40% of the total length of the substrate in the exhaust gas cleaning catalyst from the upstream-side end portion of the exhaust gas cleaning catalyst in the exhaust gas flow direction.

COMPARATIVE EXAMPLE 3

First, the material 1, the material 4, the material 6, and an $Al_2O_3$-based binder were injected into distilled water while being stirred to prepare a suspended slurry 1.

Next, the prepared slurry 1 was splashed onto a substrate, and an unneeded component was blown off with a blower, whereby the wall surface of the substrate was coated with the material to prepare a precursor layer of a downstream-side coating layer. At that time, an adjustment was made such that the amount of the material 6 reached 25 g with respect to 1 L of the substrate (25 g/L), the amount of the material 1 reached 20 g with respect to 1 L of the substrate (20 g/L), and the amount of the material 4 reached 40 g with respect to 1 L of the substrate (40 g/L). In addition, an adjustment was made such that the coating width of the precursor layer of a downstream-side coating layer occupied 80% of the total length of the substrate in the exhaust gas cleaning catalyst from the downstream-side end portion of the exhaust gas cleaning catalyst in an exhaust gas flow direction.

Finally, moisture was extracted for two hours in the dryer held at 120° C., and then the precursor layer of a downstream-side coating layer was fired for two hours in the electric furnace held at 500° C., thereby preparing a downstream-side coating layer (rear portion).

Subsequently, the material 3, the material 5, and an $Al_2O_3$-based binder were injected into distilled water under stirring in the same manner as described above to prepare a suspended slurry 2.

Next, the prepared slurry 2 was splashed onto the substrate on which the downstream-side coating layer was formed from the end surface opposite to the end surface on which the downstream-side coating layer was formed, and an unneeded component was blown off with a blower, whereby the wall surface of the substrate was coated with the material to prepare a precursor layer of an upstream-side coating layer. At that time, an adjustment was made such that the amount of the material 3 reached 13 g with respect to 1 L of the substrate (13 g/L), and the amount of the material 5 reached 25 g with respect to 1 L of the substrate (25 g/L). In addition, an adjustment was made such that the coating width of the precursor layer of an upstream-side coating layer occupied 40% of the total length of the substrate in the exhaust gas cleaning catalyst from the upstream-side end portion of the exhaust gas cleaning catalyst in the exhaust gas flow direction.

Finally, moisture was extracted for two hours in the dryer held at 120° C., and then the precursor layer of an upstream-side coating layer was fired for two hours in the electric furnace held at 500° C., thereby preparing an upstream-side coating layer (front portion), and finally, preparing an exhaust gas cleaning catalyst.

COMPARATIVE EXAMPLE 4

An exhaust gas cleaning catalyst was prepared in the same manner as in Comparative Example 1 except that, in Comparative Example 1, an adjustment was made such that the coating width of the precursor layer of a downstream-side coating layer occupied 80% of the total length of the substrate in the exhaust gas cleaning catalyst from the downstream-side end portion of the exhaust gas cleaning catalyst in the exhaust gas flow direction, and an adjustment was made such that the coating width of the precursor layer of an upstream-side coating layer occupied 60% of the total length of the substrate in the exhaust gas cleaning catalyst from the upstream-side end portion of the exhaust gas cleaning catalyst in the exhaust gas flow direction.

COMPARATIVE EXAMPLE 5

An exhaust gas cleaning catalyst was prepared in the same manner as in Comparative Example 1 except that, in Comparative Example 1, an adjustment was made such that the coating width of the precursor layer of a downstream-side coating layer occupied 80% of the total length of the substrate in the exhaust gas cleaning catalyst from the downstream-side end portion of the exhaust gas cleaning catalyst in the exhaust gas flow direction, and an adjustment was made such that the coating width of the precursor layer of an upstream-side coating layer occupied 22% of the total length of the substrate in the exhaust gas cleaning catalyst from the upstream-side end portion of the exhaust gas cleaning catalyst in the exhaust gas flow direction.

COMPARATIVE EXAMPLE 6

An exhaust gas cleaning catalyst was prepared in the same manner as in Comparative Example 2 except that, in Comparative Example 2, an adjustment was made such that the amount of the material 5 reached 15 g with respect to 1 L of the substrate (15 g/L).

COMPARATIVE EXAMPLE 7

An exhaust gas cleaning catalyst was prepared in the same manner as in Comparative Example 2 except that, in Comparative Example 2, an adjustment was made such that the amount of the material 5 reached 40 g with respect to 1 L of the substrate (40 g/L).

The catalyst configurations of the exhaust gas cleaning catalysts of Examples 1 to 4 and Comparative Examples 1 to 5 are summarized in Table 1.

I-4. Performance Evaluation

On the exhaust gas cleaning catalysts of Examples 1 to 6 and Comparative Examples 1 to 7 on which the I-3. endurance test was carried out, the following performance evaluation was carried out.

At a catalyst bed temperature of 500° C., exhaust gas having an air-fuel ratio (A/F) of 14.1 and exhaust gas having A/F of 15.1 were alternately supplied every three minutes, and the HC cleaning rate at Ga=30 g/s was evaluated. The HC cleaning rate after three minutes elapsed in the rich (A/F=14.1) atmosphere in the third alternate supply was regarded as the HC cleaning rate in the rich atmosphere.

Comparison Between Examples 1, 5, and 6 and Comparative Examples 2, 6, and 7

Figure 2:
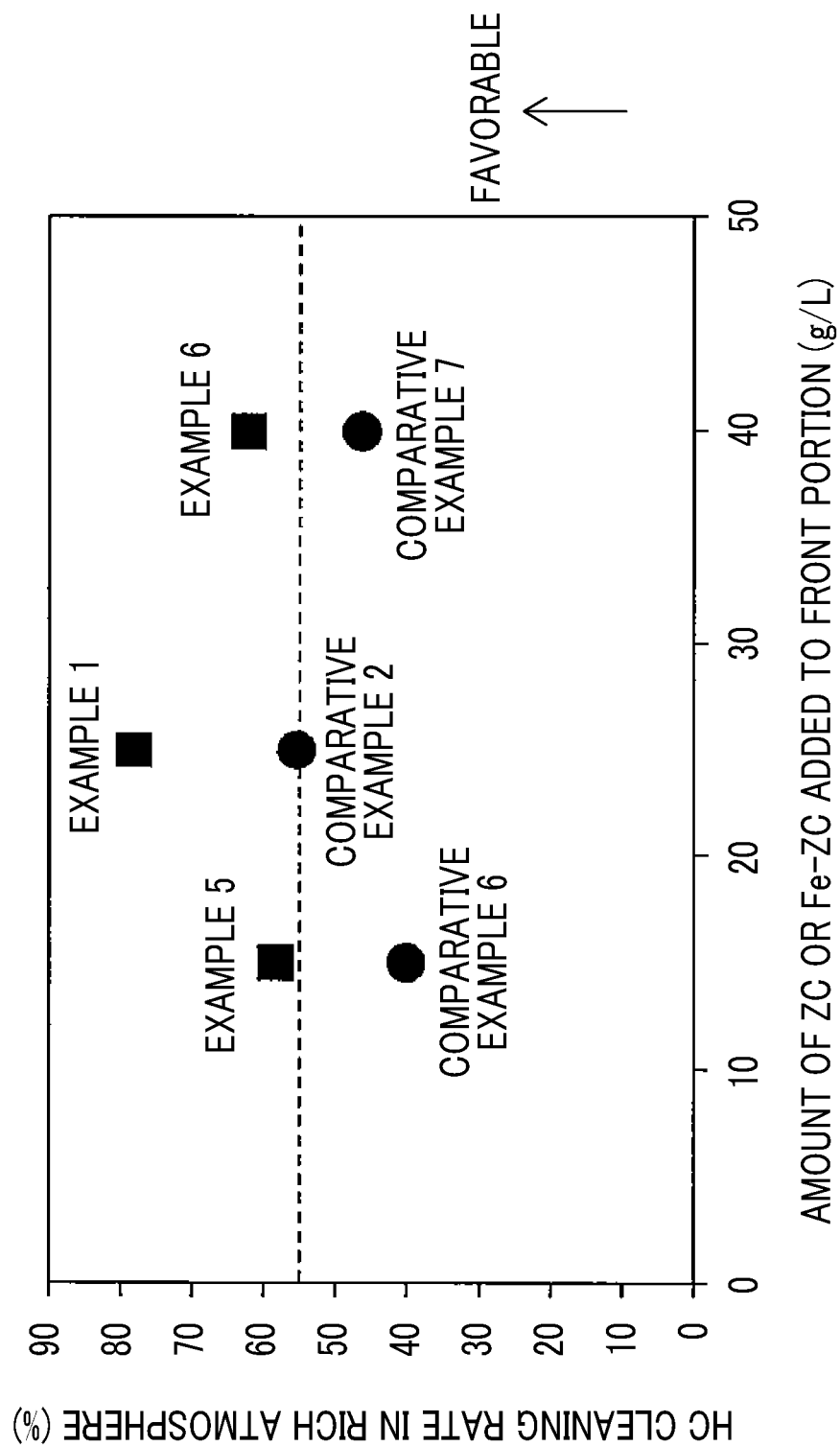
FIG. 2 shows the relationship between the amount of ZC or Fe-ZC added to the front portion of an exhaust gas cleaning catalyst and the HC cleaning rate in a rich atmosphere in exhaust gas cleaning catalysts of Examples 1, 5, and 6 and Comparative Examples 2, 6, and 7.

FIG. 2 shows the relationship between the amount of ZC or Fe-ZC added to the front portion of the exhaust gas cleaning catalyst and the HC cleaning rate in the rich

TABLE 1

Overview of catalyst configurations of Examples 1 to 4 and Comparative Examples 1 to 5

| | Downstream-side coating layer (rear portion) | | | | Upstream-side coating layer (front portion) | | |
|---|---|---|---|---|---|---|---|
| | Slurry 1 | | Amount of ZC added g/L | Coating width % | Slurry 2 | | Amount of ZC added g/L | Coating width % |
| Example 1 | Material 1 | $Al_2O_3$ | 20 | 80 | Material 3 | $Pt/Al_2O_3$ | 13 | 40 |
| | Material 4 | Rh/ZY | 40 | | Material 6 | Fe-ZC | 25 | |
| | Material 5 | ZC | 25 | | | | | |
| Example 2 | Material 1 | $Al_2O_3$ | 20 | 80 | Material 3 | $Pt/Al_2O_3$ | 13 | 60 |
| | Material 4 | Rh/ZY | 40 | | Material 6 | Fe-ZC | 25 | |
| | Material 5 | ZC | 25 | | | | | |
| Example 3 | Material 1 | $Al_2O_3$ | 20 | 80 | Material 3 | $Pt/Al_2O_3$ | 13 | 22 |
| | Material 4 | Rh/ZY | 40 | | Material 6 | Fe-ZC | 25 | |
| | Material 5 | ZC | 25 | | | | | |
| Example 4 | Material 1 | $Al_2O_3$ | 20 | 100 | Material 3 | $Pt/Al_2O_3$ | 13 | 100 |
| | Material 4 | Rh/ZY | 40 | | Material 6 | Fe-ZC | 25 | |
| | Material 5 | ZC | 25 | | | | | |
| Comparative Example 1 | Material 1 | $Al_2O_3$ | 20 | 100 | Material 3 | $Pt/Al_2O_3$ | 13 | 100 |
| | Material 4 | Rh/ZY | 40 | | Material 5 | ZC | 25 | |
| | Material 5 | ZC | 25 | | | | | |
| Comparative Example 2 | Material 1 | $Al_2O_3$ | 20 | 80 | Material 3 | $Pt/Al_2O_3$ | 13 | 40 |
| | Material 4 | Rh/ZY | 40 | | Material 5 | ZC | 25 | |
| | Material 5 | ZC | 25 | | | | | |
| Comparative Example 3 | Material 1 | $Al_2O_3$ | 20 | 80 | Material 3 | $Pt/Al_2O_3$ | 13 | 40 |
| | Material 4 | Rh/ZY | 40 | | Material 5 | ZC | 25 | |
| | Material 6 | Fe-ZC | 25 | | | | | |
| Comparative Example 4 | Material 1 | $Al_2O_3$ | 20 | 80 | Material 3 | $Pt/Al_2O_3$ | 13 | 60 |
| | Material 4 | Rh/ZY | 40 | | Material 5 | ZC | 25 | |
| | Material 5 | ZC | 25 | | | | | |
| Comparative Example 5 | Material 1 | $Al_2O_3$ | 20 | 80 | Material 3 | $Pt/Al_2O_3$ | 13 | 22 |
| | Material 4 | Rh/ZY | 40 | | Material 5 | ZC | 25 | |
| | Material 5 | ZC | 25 | | | | | |

I-3. Endurance Test

On Examples 1 to 6 and Comparative Examples 1 to 7, the following endurance test was carried out using actual engines.

The endurance test was carried out by mounting each of the exhaust gas cleaning catalysts in the exhaust system of a V8 engine and repeating the flow of exhaust gas in the stoichiometric atmosphere for a certain period of time and the flow of exhaust gas in the lean atmosphere for a certain period of time (the ratio between the periods of time was 3:1) over 46 hours at a catalyst bed temperature of 900° C.

atmosphere in the exhaust gas cleaning catalysts of Examples 1, 5, and 6 and Comparative Examples 2, 6, and 7.

From FIG. 2, it was found that, when the amount of Fe-ZC added is small, the amount of oxygen released decreases, and thus the HC cleaning performance degrades, and, when the amount of Fe-ZC added is large, Fe-ZC agglomerate, and the amount of oxygen released decreases, and thus the HC cleaning performance degrades. Therefore, it was found that the amount of Fe-ZC added to the exhaust gas cleaning catalyst is preferably 10 g to 45 g and more preferably 15 g to 40 g with respect to 1 L of the substrate.

Comparison Between Example 1 and Comparative Examples 1 to 3

Figure 3:
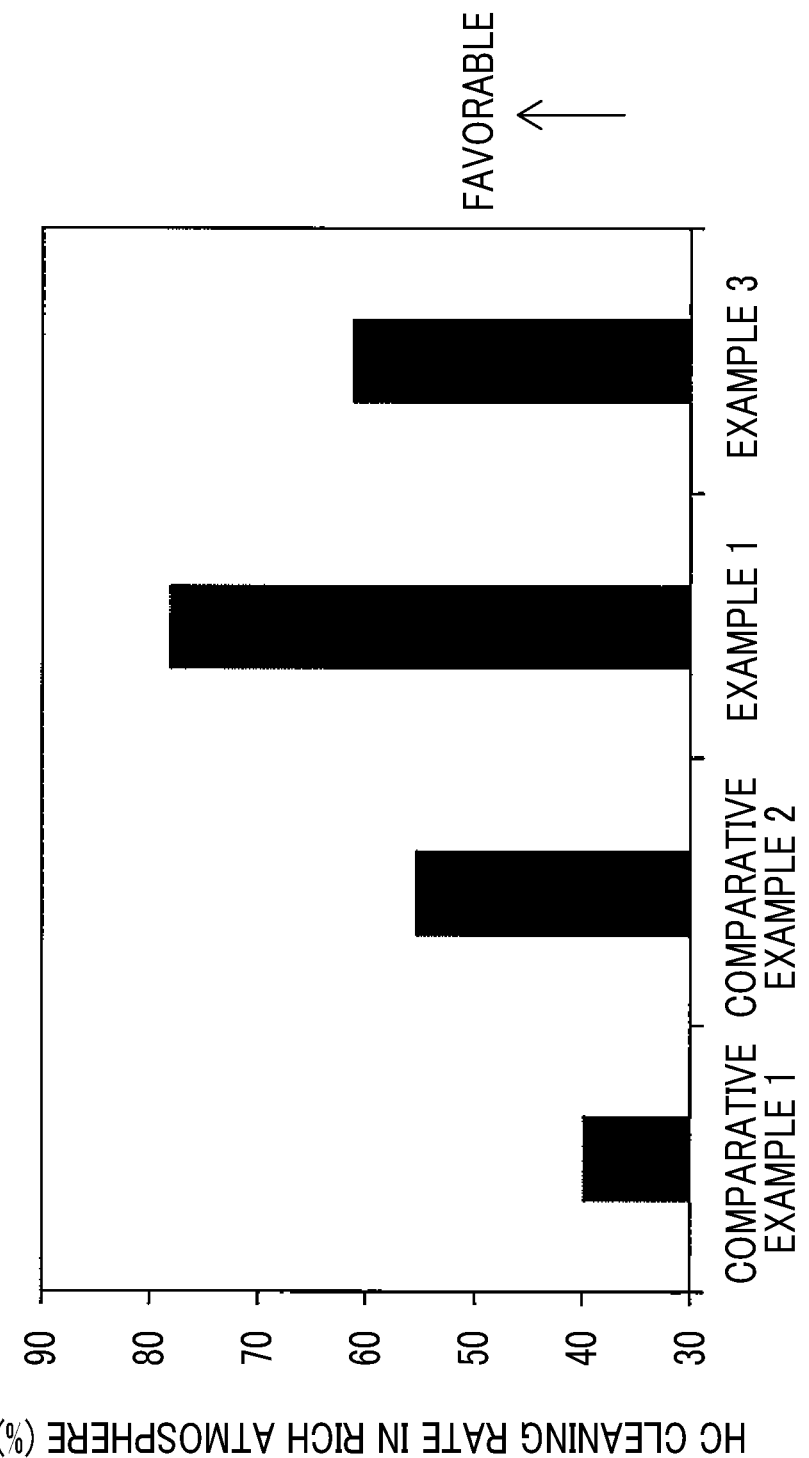
FIG. 3 is a view showing the HC cleaning rates in the rich atmosphere in the exhaust gas cleaning catalysts of Example 1 and Comparative Examples 1 to 3.

Table 2 shows the catalyst configurations of the exhaust gas cleaning catalysts of Example 1 and Comparative Examples 1 to 3, and FIG. 3 shows the HC cleaning rates in the rich atmosphere of the exhaust gas cleaning catalysts of Example 1 and Comparative Examples 1 to 3.

TABLE 2

Overview of catalyst configurations of Example 1 and Comparative Examples 1 to 3

| | Addition position | Material added | Amount of ZC added (g/L) | Coating width of catalyst front portion (%) | Coating width of catalyst rear portion (%) |
|---|---|---|---|---|---|
| Comparative Example 1 | Front portion | ZC* | 25 | 100 | 100 |
| Comparative Example 2 | Front portion | ZC* | 25 | 40 | 80 |
| Example 1 | Front portion | Fe-ZC | 25 | 40 | 80 |
| Comparative Example 3 | Rear portion | Fe-ZC | 25 | 40 | 80 |

*ZC: Ceria-zirconia composite oxide to which Fe is not added

From the comparison between Comparative Example 1 and Comparative Example 2, it was found that, when the coating width of the front portion of the exhaust gas cleaning catalyst is narrowed, the HC cleaning rate in the rich atmosphere improves. This is considered to be because the densification of Pt in the front portion facilitates ignition, and the HC cleaning performance improves.

From the comparison between Comparative Example 2 and Example 1, it was found that, when Fe-ZC having higher oxygen absorption and release performance than ZC is added to the front portion of the exhaust gas cleaning catalyst in which Pt is densified by narrowing the coating width, the HC cleaning performance further improves. This is considered to be because the substitution of ZC with Fe-ZC increases the amount of oxygen supplied, which is used for the cleaning of HC.

From the comparison between Comparative Example 3 and Example 1, it was found that the HC cleaning performance improvement effect can be obtained by the coexistence of Pt and Fe-ZC.

It is considered that the HC cleaning performance improvement effect can be obtained in the same manner even when Pd, which has as high HC cleaning performance as Pt, is used.

Comparison Between Examples 1 to 4 and Comparative Examples 1, 2, 4, and 5

Figure 4:
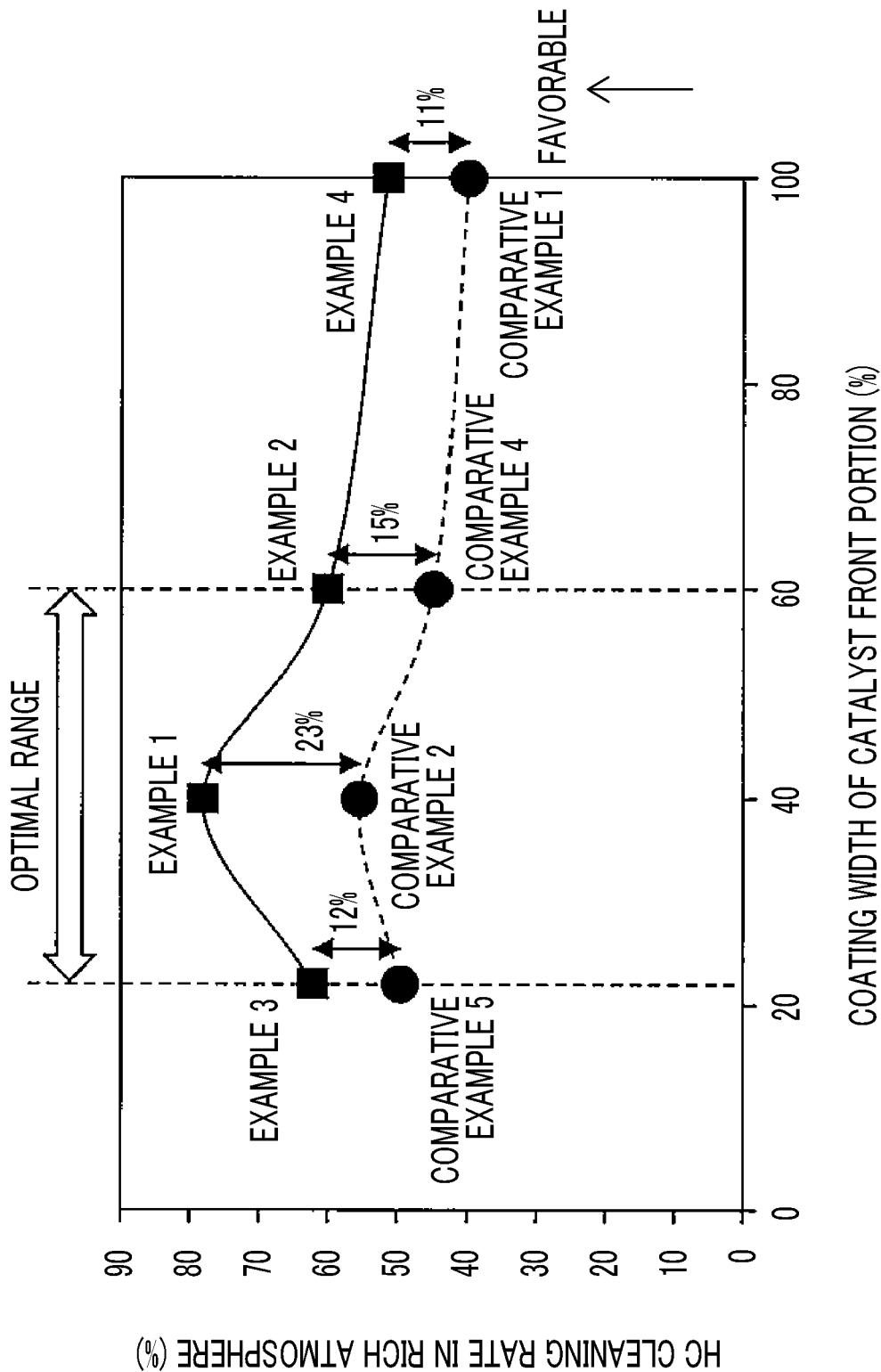
FIG. 4 is a view showing the relationship between the coating width of the front portion of the exhaust gas cleaning catalyst and the HC cleaning rate in the rich atmosphere in the exhaust gas cleaning catalysts of Examples 1 to 4 and Comparative Examples 1, 2, 4, and 5.

FIG. 4 shows the relationship between the coating width of the front portion of the exhaust gas cleaning catalyst and the HC cleaning rate in the rich atmosphere in the exhaust gas cleaning catalysts of Examples 1 to 4 and Comparative Examples 1, 2, 4, and 5.

From the comparison between Examples 1 to 4 and Comparative Examples 1, 2, 4, and 5, it was found that, as described above, when Fe-ZC, which has higher oxygen absorption and release performance than ZC, is added, the HC cleaning performance further improves. In addition, from the comparison between the examples or between the comparative examples, it was found that, when the coating width in the front portion of the exhaust gas cleaning catalyst is narrowed to densify Pt, the degree of development of the HC cleaning performance improvement effect increases. This is considered to be because a short coating width increases the contact frequency between Fe-ZC or ZC and Pt. On the other hand, it was found that, while the coating width in the front portion of the exhaust gas cleaning catalyst continues to be narrowed, the HC cleaning performance degrades at a certain point. This is considered to be because, when the coating width in the front portion of the exhaust gas cleaning catalyst is excessively narrowed, the densification of Pt leads to the agglomeration of Pt, and thus the degree of the contribution decreases. Therefore, it was found that the coating width in the front portion is preferably 15% to 65% and more preferably 22% to 60% of the total length of the substrate in the exhaust gas cleaning catalyst.

It is considered that the HC cleaning performance improvement effect can be obtained in the same manner even when Pd, which has as high HC cleaning performance as Pt, is used.

What is claimed is:
1. An exhaust gas cleaning catalyst comprising:
a substrate; and
a catalyst coating layer coated on the substrate,
wherein the catalyst coating layer has an upstream-side coating layer formed from an upstream-side end portion of the exhaust gas cleaning catalyst in an exhaust gas flow direction and a downstream-side coating layer formed from a downstream-side end portion of the exhaust gas cleaning catalyst in the exhaust gas flow direction,
when the upstream-side coating layer and the downstream-side coating layer overlap each other, the upstream-side coating layer is disposed on the downstream-side coating layer,
the upstream-side coating layer contains a noble metal and a $ZrO_2$-$CeO_2$ composite oxide in which Fe forms a solid solution, and
a width of the upstream-side coating layer is 15% to 65% of a total length of the substrate in the exhaust gas cleaning catalyst from the upstream-side end portion of the exhaust gas cleaning catalyst in the exhaust gas flow direction.
2. The exhaust gas cleaning catalyst according to claim 1, wherein the width of the upstream-side coating layer is 22% to 60% of the total length of the substrate in the exhaust gas cleaning catalyst from the upstream-side end portion of the exhaust gas cleaning catalyst in the exhaust gas flow direction.
3. An exhaust gas cleaning catalyst comprising:
a substrate; and
a catalyst coating layer coated on the substrate,
wherein the catalyst coating layer has an upstream-side coating layer formed from an upstream-side end portion of the exhaust gas cleaning catalyst in an exhaust gas flow direction and a downstream-side coating layer formed from a downstream-side end portion of the exhaust gas cleaning catalyst in the exhaust gas flow direction,
when the upstream-side coating layer and the downstream-side coating layer overlap each other, the upstream-side coating layer is disposed on the downstream-side coating layer,
the upstream-side coating layer contains a noble metal and a $ZrO_2$-$CeO_2$ composite oxide in which Fe forms a solid solution, a width of the downstream-side coating layer is 60% to 100% of a total length of the substrate in the exhaust gas cleaning catalyst from the downstream-side end portion of the exhaust gas cleaning catalyst in the exhaust gas flow direction, and a wrap width of a region in which the upstream-side coating layer and the downstream-side coating layer overlap each other is 10% to 40% of the total length of the substrate in the exhaust gas cleaning catalyst.

4. An exhaust gas cleaning catalyst comprising:

a substrate; and a catalyst coating layer coated on the substrate, wherein the catalyst coating layer has an upstream-side coating layer formed from an upstream-side end portion of the exhaust gas cleaning catalyst in an exhaust gas flow direction and a downstream-side coating layer formed from a downstream-side end portion of the exhaust gas cleaning catalyst in the exhaust gas flow direction, when the upstream-side coating layer and the downstream-side coating layer overlap each other, the upstream-side coating layer is disposed on the downstream-side coating layer, the upstream-side coating layer contains a noble metal and a $ZrO_2$-$CeO_2$ composite oxide in which Fe forms a solid solution, and an amount of the $ZrO_2$-$CeO_2$ composite oxide in which Fe forms a solid solution is 10 g to 45 g with respect to 1 L of the substrate.

5. The exhaust gas cleaning catalyst according to claim 4, wherein an amount of the $ZrO_2$-$CeO_2$ composite oxide in which Fe forms a solid solution is 15 g to 40 g with respect to 1 L of the substrate.

* * * * *